UNITED STATES PATENT OFFICE 2,394,067

SENSITIZING DYESTUFFS AND DYESTUFF INTERMEDIATES

John David Kendall and Douglas James Fry, Ilford, England, assignors to Ilford Limited, Ilford, England, a British company No Drawing. Application August 21, 1941, Serial No. 407,839. In Great Britain October 16, 1940.

7 Claims. (Cl. 260—305)

This invention relates to the production of dyestuff intermediates and to the production therefrom of dyestuffs capable of sensitising gelatino-silver halide photographic emulsions.

According to this invention, dyestuff intermediates are produced by reacting a heterocyclic nitrogen compound of the general formula:

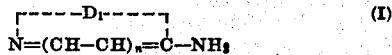   (I)

with an ortho ester of a monocarboxylic acid of the general formula:

   (II)

(where $D_1$ is the residue of a heterocyclic nucleus, $n$ is nought or 1, and $R_1$ and $R_2$ are alkyl, aralkyl or aryl groups).

The course of the reaction may be indicated as follows:

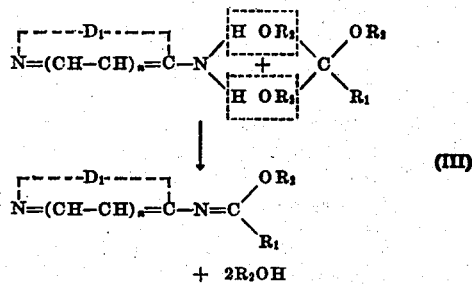

$+ 2R_2OH$

The heterocyclic nitrogen compound employed may be any of those commonly employed in the manufacture of cyanine dyes. Typical examples are set forth hereinafter. The ortho-ester may be, for example, an ester of ortho-acetic acid, ortho-propionic acid or ortho-benzoic acid. Preferably an ethyl ortho ester is employed though other alkyl orthoesters or aryl or aralkyl orthoesters may be employed, if desired.

According to a further feature of the invention, dyestuffs are produced by condensing an alkyl or aralkyl quaternary salt of a dyestuff intermediate of the general Formula III with an alkyl or aralkyl quaternary salt of a heterocyclic nitrogen compound containing an external reactive methyl, monosubstituted methyl, or amino group in the $\alpha$- or $\gamma$-position to the heterocyclic nitrogen atom or with a corresponding heterocyclic nitrogen base obtainable by the elimination of a hydrogen atom and the acid residue from such quaternary salt.

The course of this reaction may be illustrated as follows, where a heterocyclic nitrogen compound containing an external reactive methyl or mono-substituted methyl group is employed:

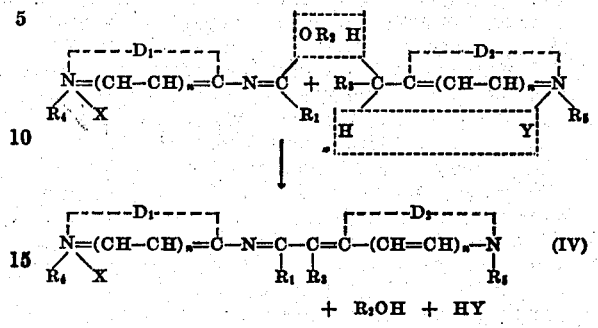

$+ R_2OH + HY$

Where the corresponding heterocyclic nitrogen base is employed, the reaction proceeds similarly but the groups H and Y are not present so that the acid HY is not eliminated. Where the heterocyclic compound contains a reactive amino group, the two hydrogen atoms of such amino group are eliminated as $R_2OH$ and HY leaving a nitrogen atom instead of the

group of Formula IV.

Although it is indicated above that the acid HY is eliminated in the reaction it is to be appreciated that in some cases the acid HX is eliminated. In all compounds of this general type the position of the acid residue X or Y is in doubt and it possibly resonates between the two quaternary nitrogen atoms.

In the foregoing formulae, the groups $D_1$ and $D_2$ are the residues of heterocyclic nuclei, e. g. residues of the nuclei of substituted or unsubstituted thiazoles, thiazolines, oxazoles, oxazolines, selenazoles, selenazolines, pyridine, quinoline, indolenine, diazines (e. g. pyrimidine) thio-diazoles and quinazoline and the corresponding substituted or unsubstituted polycyclic compounds such as benzthiazoles, naphthathiazoles and anthrathiazoles, and also the diazines described in British specification No. 425,609.

The groups $R_1$, $R_2$, $R_3$, $R_4$, and $R_5$ may be alkyl or aralkyl groups; examples are methyl, ethyl, propyl, butyl and higher alkyl groups, and benzyl and naphthyl-methyl groups. The groups $R_1$, $R_2$ and $R_3$ may be aryl groups, and examples are phenyl and naphthyl groups. Such aryl groups may themselves be substituted, e. g. by alkyl, amino, hydroxy, alkoxy and oxyalkyl groups and by halogen atoms. The group R₃ may be a hydrogen atom.

In forming dyestuffs in accordance with this invention the quaternary salts employed may be, for example, alkyl- or aralkyl-chlorides, bromides, iodides, sulphates or perchlorates. Preferably, however, the quaternary salts employed are alkyl- or aralkyl-p-toluene sulphonates, e. g. methyl or ethyl-p-toluene sulphonate.

In carrying out the process for the production of the dyestuffs, it is not necessary to isolate the quaternary salts of the two reactants. Thus by condensing a dyestuff intermediate of the general Formula III above with a heterocyclic nitrogen compound containing a methyl, a mono-substituted methyl or an amino group in the α- or γ-position to the nitrogen atom, in the presence of a sufficiency of alkyl or aralkyl salt to convert both compounds to quaternary salts, the reaction may be effected in one stage. A particularly convenient method is to employ an alkyl or aralkyl-p-toluene sulphonate and to effect the reaction by fusing together the dyestuff intermediate of the general Formula III, the heterocyclic nitrogen compound containing the reactive group and the alkyl or aralkyl-p-toluene sulphonate.

Preferably, in the production of dyestuffs according to this invention, the condensation is completed in the presence of an acid binding agent, e. g. pyridine, piperidine, triethylamine, sodium acetate or sodium carbonate.

In naming the dyestuffs produced according to this invention which have the general Formula IV, they are regarded as trimethine cyanines in which one or more methine groups are replaced by nitrogen. This is signified in the name of the compound by the introduction of the term "az" preceding the word trimethine, the position of the az group or groups being indicated by a figure relating it to the heterocyclic ring to which it is directly attached.

The following examples illustrate the invention:

EXAMPLE I

*Preparation of N(1-benzthiazolyl)-acetimino ethyl ether*

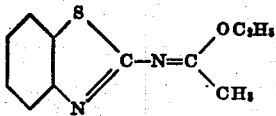

37 gms. of 1-aminobenzthiazole and 50 gms. of ethyl ortho acetate were mixed together and heated for fifteen minutes under a reflux condenser. Ethyl alcohol formed in the reaction was distilled off and the residue was then distilled under reduced pressure. The product was thus obtained as colourless oil which turned yellow on standing, having a boiling point of 198° C. at 29 mm. pressure.

EXAMPLE II

*Preparation of 2:2'-diethyl-8-methyl-7-az-trimethine-thiaselenacyanine iodide*

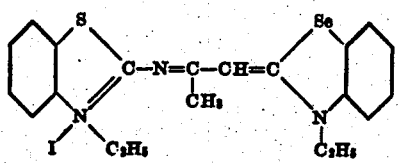

A mixture of 2.04 gms. of N(1-benzthiazolyl)-acetimino ethyl ether (Example I), 1.95 gms. of 1-methyl benzselenazole and 4.00 gms. of ethyl-p-toluene sulphonate was fused for three hours at 140–150° C. 20 ccs. of pyridine were then added to the mixture and the mixture boiled for half-an-hour. The mixture was then poured into potassium iodide solution and the precipitated dyestuff removed by filtration. On boiling out the product with methyl alcohol and removing impurities, the desired dyestuff was obtained as a reddish brown powder, melting at 278° C.

The corresponding 2:2'-dimethyl-8-methyl-7-az-trimethine-thiaselenacyanine bromide may be prepared by a similar method using methyl-p-toluene sulphonate. It is a brown solid melting at 252° C.

EXAMPLE III

*Preparation of 2.1'-dimethyl-8-methyl-7-az-trimethine-thiaquinocyanine iodide*

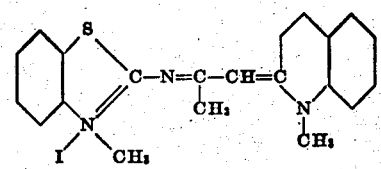

A mixture of 2.04 gms. of N(1-benzthiazolyl)-acetimino ethyl ether, 3.72 gms. of methyl-p-toluene sulphonate and 1.43 gms. of quinaldine was fused for three hours at 130 to 140° C. 20 ccs. of pyridine were then added to the mixture and the mixture refluxed for half-an-hour. The mixture was then poured into potassium iodide solution, diluted with water, and filtered. The solid material separated by filtration was recrystallised from methyl alcohol and yielded the desired dyestuff as a dark brown solid, melting at 210° C.

EXAMPLE IV

*Preparation of 2.2'-diethyl-8-methyl-7-az-trimethine-thiacyanine iodide*

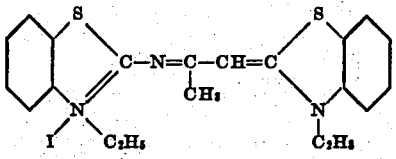

A mixture of 10.1 gms. of N(1-benzthiazolyl)-acetimino ethyl ether, 7.5 gms. of 1-methylbenzthiazole and 20 gms. of ethyl-p-toluene sulphonate was fused for three hours at 130° to 140° C. 100 ccs. of pyridine was then added and the mixture was warmed on a water bath and then refluxed for half-an-hour. The mixture was then poured into potassium iodide solution and the precipitated dyestuff separated by filtration. On recrystallisation the product was obtained as a red dye, melting at 206° C.

The corresponding 2.2'-dimethyl-8-methyl-7-az-trimethine-thiacyanine iodide may be prepared by a similar method, using methyl-p-toluene sulphonate. It is a red solid, melting at 276° C.

EXAMPLE V

*Preparation of 2.2'-dimethyl-8-methyl-7.7'-diaz-trimethine-thiacyanine iodide*

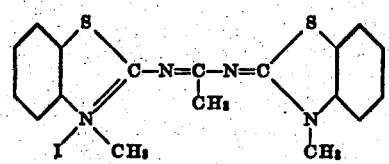

A mixture of 2.0 gms. of N-(1-benzthiazolyl)-acetimino ethyl ether, 1.5 gms. of 1-aminobenzthiazole and 3.72 gms. of methyl-p-toluene sulphonate was fused for three hours at 140° to 150° C. 20 ccs. of pyridine were then added and the mixture was refluxed for half-an-hour. The mixture was then poured into potassium iodide solution whereupon the dyestuff separated out. On recrystallisation from methyl alcohol, the product was obtained as a light brown solid melting at 268° C.

EXAMPLE VI

*Preparation of 2.2'-dimethyl-8-methyl-7-az-trimethine thiaoxacyanine iodide*

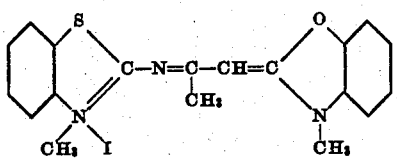

A mixture of 10.1 gms. of N-(1-benzthiazolyl)-acetimino ethyl ether, 6.7 gms. of 1-methyl benzoxazole and 18.6 gms. of methyl-p-toluene sulphonate was fused for three hours at 120–130° C. 100 ccs. of pyridine were then added and the mixture refluxed for an hour. The product was poured into potassium iodide solution whereupon a dark oil separated. This was decanted off and dissolved in hot ethyl alcohol. On cooling, the desired dyestuff was precipitated. It was recrystallised from ethyl alcohol solution and had a melting point of 145° C.

EXAMPLE VII

*Preparation of N-(1-benzoxazolyl) - acetimino ethyl ether*

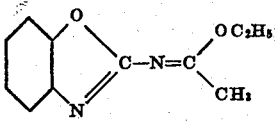

8.5 gms. of 1-amino benzoxazole and 11.5 gms. of ethyl orthoacetate were boiled together for 15 minutes. The alcohol formed in the reaction was removed by distillation at normal pressure and the residue was then distilled at reduced pressure. The product was thus obtained as a pale yellow oil solidifying to colourless prisms and boiling at 164–166° C. at 25 mm. pressure.

EXAMPLE VIII

*Preparation of N-(1-β-naphthathiazolyl)-acetimino ethyl ether*

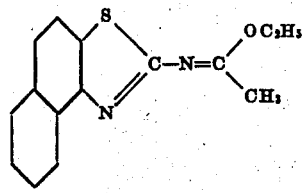

The preparation was effected as in Example VII using 22 gms. 2-amino-β-naphthathiazole and 25 gms. of ethyl ortho acetate. The product consisted of a light yellow solid melting at 60° C. and boiling at 246° C. at 25 mm. pressure.

EXAMPLE IX

*Preparation of N-(1-benzthiazolyl)-propionimino ethyl ether*

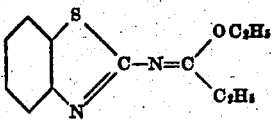

The preparation was effected as in Example VII using 14.8 gms. of 1-amino benzthiazole and 18.6 gms. of ethyl ortho propionate. The product consisted of a yellow oil boiling at 204° C. at 25 mm. pressure.

EXAMPLE X

*Preparation of N-1-(5 - ethoxy - benzthiazolyl)-acetimino ethyl ether*

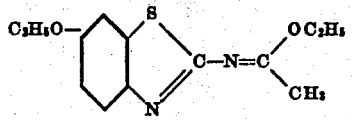

The preparation was effected as in Example VII using 13 gms. of 1-amino-5-ethoxy-benzthiazole and 11 gms. of ethyl ortho acetate. The product consisted of a light yellow oil boiling at 223° C. at 25 mm. pressure.

EXAMPLE XI

*Preparation of 2.2'-dimethyl-8-methyl-7-az-trimethine oxathiacyanine iodide*

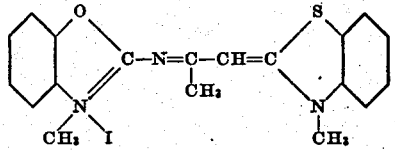

The preparation was effected as in Example VI using 10 gms. of N-(-1-benzoxazolyl)-acetimino ethyl ether, 7.5 gms. of 1-methyl benzthiazole and 18.6 gms. of methyl-p-toluene sulphonate. The dyestuff precipitated out from the potassium iodide solution and was obtained as red crytals melting above 250° C.

EXAMPLE XII

*Preparation of 2.2'-dimethyl-8-methyl-7-az-trimethine naphthathiacyanine iodide*

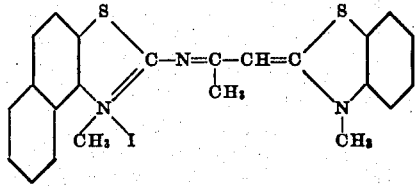

The preparation was effected as in Example VI using 9.7 gms. of N-1-(β-naphthathiazolyl) acetimino ethyl ether, 4.9 gms. of 1-methyl-benzthiazole and 12.4 gms. of methyl-p-toluene sulphonate. The dyestuff was obtained as red crystals melting at 247° C.

EXAMPLE XIII

*Preparation of 2.2'-dimethyl-8-ethyl-7 - az - trimethine thiacyanine iodide*

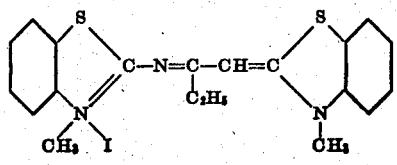

The preparation was effected as in Example VI using 13 gms. N-(1-benzthiazolyl) propionimino ethyl ether, 8.4 gms. 1-methyl-benzthiazole and 21 gms. of methyl-p-toluene sulphonate. The dye was obtained as a red solid melting at 247° C.

EXAMPLE XIV

Preparation of the dyestuff of the formula:

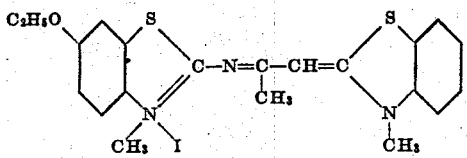

The preparation was effected as in Example VI using 11.8 gms. of N-1-(5-ethoxy benzthiazolyl) acetimino ethyl ether, 6.6 gms. of 1-methyl benzthiazole and 17 gms. of methyl-p-toluene sulphonate. The dye was obtained as fluffy orange crystals melting at 164° C.

EXAMPLE XV

Preparation of the dyestuff of the formula:

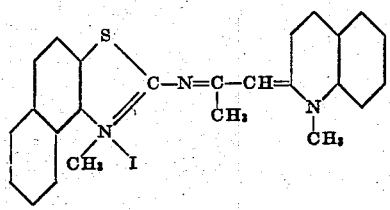

The preparation was effected as in Example VI using 9.7 gms. of N-1-(β-naphthathiazolyl) acetimino ethyl ether, 4.7 gms. of quinaldine and 12.4 gms. of methyl-p-toluene sulphonate. The dye was obtained as a brown solid melting at 212° C.

The dyestuffs produced according to the present invention are sensitisers for gelatino-silver halide emulsions, e. g. silver chloride and silver bromide and silver iodo bromide emulsions.

What we claim is:

1. Process for the production of dyestuff intermediates which comprises reacting a mol of a heterocyclic nitrogen compound of the general formula:

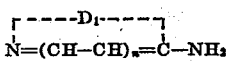

with a mol of an ortho ester of a monocarboxylic acid of the formula:

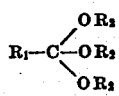

where $D_1$ is the residue of a heterocyclic compound of the type used in cyanine dyes, $n$ is selected from the group consisting of nought and 1 and $R_1$ and $R_2$ are selected from the group consisting of alkyl, aryl and aralkyl groups by heating the reactants together in the absence of a basic condensing agent so as to form 2 mols of a monohydric alcohol and a dyestuff intermediate of the formula:

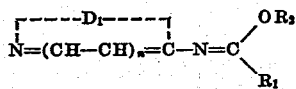

wherein $D_1$, $R_1$, $R_2$ and $n$ have the above significance.

2. Process according to claim 1 wherein the ortho ester employed is selected from the group consisting of the alkyl esters of ortho acetic acid and of higher homologues of ortho acetic acid.

3. Dyestuff intermediates of the general formula:

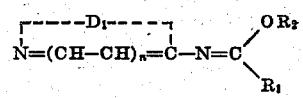

where $D_1$ is the residue of a heterocyclic compound of the type used in cyanine dyes, $n$ is selected from the group consisting of nought and 1 and $R_1$ and $R_2$ are selected from the group consisting of alkyl, aryl and aralkyl groups.

4. A process for the production of dyestuff intermediates which comprises reacting one mol of a heterocyclic nitrogen compound of the general formula:

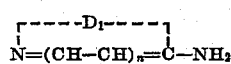

wherein $D_1$ is the residue of a heterocyclic nitrogen compound of the type used in the preparation of cyanine dyes and $n$ is a number selected from the group consisting of nought and 1, with one mol of an ortho ester of a monocarboxylic acid taken from the group consisting of the alkyl esters of ortho acetic acid and the higher homologues of ortho acetic acid, by heating the reactants together in the absence of a basic condensing agent so as to form 2 mols of a mono-, hydric alcohol and a dyestuff intermediate of the formula:

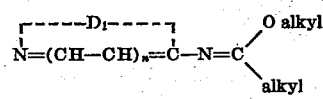

wherein $D_1$ and $n$ have the above significance.

5. A dyestuff intermediate of the formula

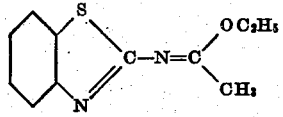

which is a colorless oil having a boiling point of 198° C. at 29 mm. pressure.

6. A dyestuff intermediate of the formula

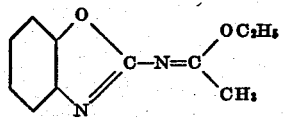

which is a pale yellow oil solidifying to colorless prisms and boiling at 164–166° C. at 25 mm. pressure.

7. A dyestuff intermediate of the formula

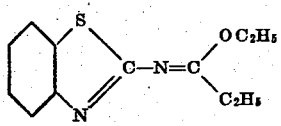

which is a yellow oil boiling at 204° C. at 25 mm. pressure.

JOHN DAVID KENDALL.
DOUGLAS JAMES FRY.